C. K. HOLT.
TRACTION DEVICE FOR WHEELS.
APPLICATION FILED OCT. 12, 1921.

1,427,813. Patented Sept. 5, 1922.

WITNESSES

INVENTOR
Christopher K. HOLT,
BY
ATTORNEYS

Patented Sept. 5, 1922.

1,427,813

UNITED STATES PATENT OFFICE.

CHRISTOPHER KEAWEOPALA HOLT, OF HONOLULU, TERRITORY OF HAWAII.

TRACTION DEVICE FOR WHEELS.

Application filed October 12, 1921. Serial No. 507,285.

*To all whom it may concern:*

Be it known that I, CHRISTOPHER KEAWEOPALA HOLT, a citizen of the United States, and a resident of Honolulu, Territory of Hawaii, have invented certain new and useful Improvements in Traction Devices for Wheels, of which the following is a specification.

My invention relates to vehicle wheels and more particularly to traction devices therefor by means of which sufficient traction is secured to effect the removal of the wheel and vehicle from sandy, muddy or snowy surfaces or depressions in a roadway.

The purpose of my invention is the provision of a traction device of the above described character which is simple and inexpensive in construction, and which can be readily attached to or detached from a vehicle or automobile wheel, and when in applied position provides sufficient traction to effect the ready removal of the wheel and vehicle from the slippery surfaces of a roadway.

I will describe one form of traction device embodying my invention, and will then point out the novel features thereof in a claim.

Figure 3:
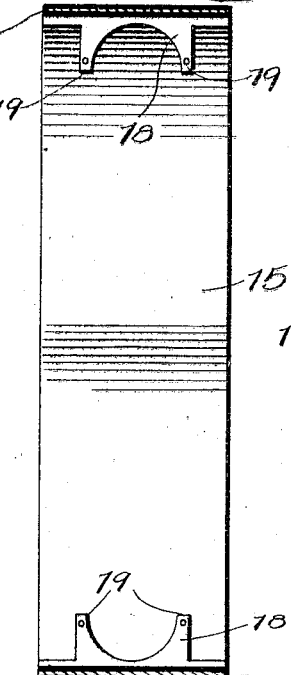
Figure 3 is a horizontal sectional view of the traction device shown in Figure 1.

Referring specifically to the drawings in which similar reference characters refer to similar parts, S and S' designate two semicircular sections comprising the traction device. Each section S or S' consists of a relatively wide metallic rim section 15 bent longitudinally in the form of a semi-circle and having its outer periphery covered with a sheet of vulcanized rubber 16. The sheet 16 is formed at regular spaced intervals with transversely extending knobs or cleats 17 which are co-extensive in width with the sheet. For the purpose of attaching the two sections of the device together and in circular formation, guides 18 are formed at the ends of the sections and preferably integral with the metallic rim section 15. As clearly shown in Figure 3, each guide 18 is of arcuate form in cross section so as to accommodate the tire of the wheel, and in so forming the guide inwardly projecting ears 19 are provided which are formed with openings through which bolts or other suitable fastening members 20 are adapted to extend and to be secured therein by means of nuts 21. Two bolts 20 are provided for each pair of guides 18, and it will be understood by an adjustment of the nuts, the bolts will function to draw the guides together and to thereby effect the construction of the device so as to snugly embrace the tire of a wheel.

Figure 1:
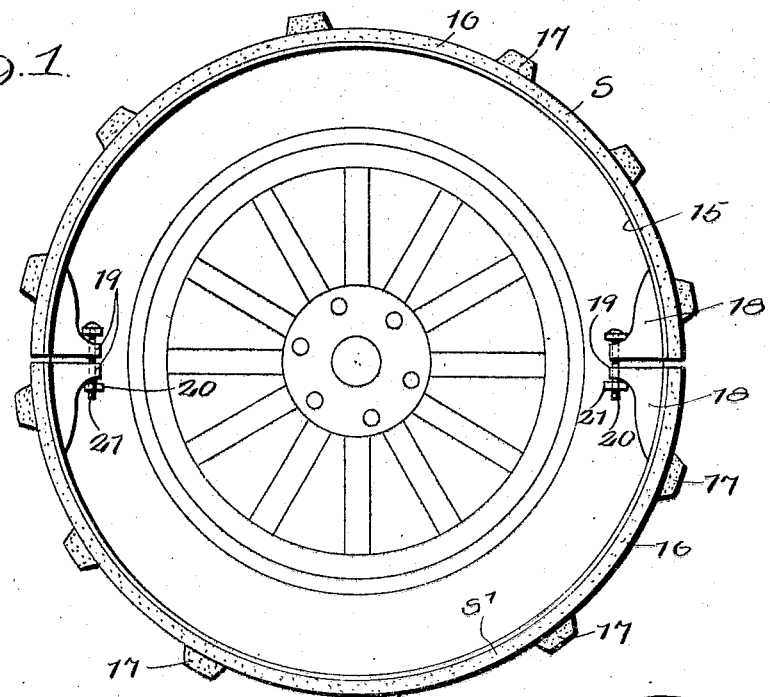
Figure 1 is a view showing in side elevation an automobile wheel having applied thereto one form of traction device embodying my invention.
Figure 2:
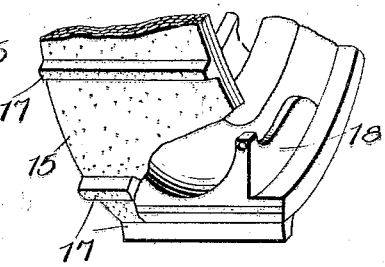
Figure 2 is a perspective view of the traction device showing an automobile tire therein.

In the applied position of the device as shown in Figures 1 and 2, the rim of each section contacts with the tread surface of the tire, while the ears 19 are disposed at opposite sides of the tire and wholly within the device so that they may be conveniently reached in effecting the adjustment of the guides to securely clamp the sections in embracing position with respect to the tire. In this applied position of the device, it will be manifest that because of the increased width given to the tread of the wheel it will have much greater traction, and by the additional traction obtained as a result of the knobs or cleats 17, the device effectively serves to remove the wheel from any soft spot in the roadway in which sufficient traction cannot ordinarily be obtained to remove the wheel from the spot.

The device can obviously be readily removed by the removal of the nuts and bolts, thus allowing the removal of the upper section, and by rotating the wheel so as to dispose the lower section to the upper side of the wheel, or by jacking up the entire wheel, the other section can be readily removed.

Although I have herein shown and described only one form of traction device embodying my invention, it is to be understood that various changes and modifications may be made herein without departing from the spirit of the invention or the spirit and scope of the appended claim.

What I claim is:

A traction device for wheels, comprising two semi-circular rim sections, each having a width appreciably exceeding the width of a vehicle tire, guides disposed adjacent the ends of the inner periphery of each section, said guides of arcuate form in cross section to accommodate the tire, perforated ears formed on the guides and extending radially therefrom, a resilient covering for each of the sections, said cover being coextensive in width with the section, and cleats carried by said coverings.

CHRISTOPHER KEAWEOPALA HOLT.